United States Patent [19]
Connors et al.

[11] 3,912,329
[45] Oct. 14, 1975

[54] SEAT BELT ASSEMBLY

[75] Inventors: David G. Connors, Plymouth; Harkrishan Singh, Dearborn Heights, both of Mich.

[73] Assignee: Ford Motor Company, Dearborn, Mich.

[22] Filed: July 1, 1974

[21] Appl. No.: 484,898

[52] U.S. Cl. ........ 297/389; 24/265 BC; 24/265 AL; 24/230 R; 24/230 AU
[51] Int. Cl.² ...................... A47C 31/00; A44C 5/18; A44B 11/25
[58] Field of Search..... 24/230 R, 230 AU, 265 BC, 24/265 H, 265 R, 265 AL; 297/389

[56] References Cited
UNITED STATES PATENTS

| | | | |
|---|---|---|---|
| 1,436,684 | 11/1922 | Rosenband | 24/265 AL |
| 2,833,010 | 5/1958 | Rosenthal | 24/265 R |
| 3,306,653 | 2/1967 | Gaylord | 24/230 AV |
| 3,414,322 | 12/1968 | Linderoth | 297/389 |
| 3,418,007 | 12/1968 | Jantzen | 297/389 |
| 3,841,659 | 10/1974 | Peel | 297/389 |

FOREIGN PATENTS OR APPLICATIONS

| | | | |
|---|---|---|---|
| 1,337,405 | 8/1963 | France | 24/265 AL |
| 532,656 | 1/1941 | United Kingdom | 24/265 BC |

*Primary Examiner*—Bernard A. Gelak
*Attorney, Agent, or Firm*—John J. Roethel; Keith L. Zerschling

[57] ABSTRACT

A seat belt assembly comprising a tongue plate having a buckle latch engaging portion and a webbing receiving portion. The webbing receiving portion has slot means through which ends of a lap belt and a shoulder harness webbing have been threaded. Each webbing end after having been threaded through the slot means has been folded against and stitched to its webbing. This results in a permanent loop coupling the webbing to the tongue plate.

The improvement comprises an auxiliary slot extending from an edge of the tongue plate to the slot means. The auxiliary slot provides a passageway through which a webbing loop may be passed for disassembly of a webbing from the tongue plate.

Preferably, a displaceable means affixed to the tongue plate blocks passage of the loops through the auxiliary slot.

1 Claim, 3 Drawing Figures

SEAT BELT ASSEMBLY

BACKGROUND OF THE INVENTION

Three-point seat belt systems as are currently used to restrain the vehicle operator and the outboard front seat passenger of a vehicle are of the "must wear" type. That is, both the shoulder harness webbing and the lap belt webbing are permanently coupled to a common tongue plate engageable with a seat belt buckle latch mechanism. Since both webbings are coupled to a common tongue plate, it is necessary that both the shoulder harness webbing and lap belt webbing be fitted around the seat occupant before the seat belt assembly can be buckled.

The shoulder harness and lap belt webbings conventionally are each anchored to the vehicle body through separate retractor mechanisms. The two retractor mechanisms and the shoulder harness and lap belt webbings are pre-assembled and installed as a unit in the vehicle body. This has one disadvantage. If either retractor mechanism has to be removed for repairs or replacement, both mechanisms must be removed.

It is an object of the present invention to permit uncoupling of at least one webbing from the tongue plate so that only the retractor mechanism requiring repair or replacement need be removed from the vehicle body.

SUMMARY OF THE INVENTION

The present invention relates to a seat belt assembly comprising a tongue plate having a buckle latch engaging portion and a webbing receiving portion. The webbing receiving portion of the tongue plate has slot means through which ends of a lap belt and a shoulder harness webbing have been threaded. Each webbing end, after having been threaded through the slot means and then folded against its webbing, is stitched to its webbing into a permanent loop coupled to the tongue plate.

The improvement comprises an auxiliary slot extending from an edge of the tongue plate to the slot means, the auxiliary slot providing a passageway through which a webbing loop may be passed for disassembly of a webbing from the tongue plate without destroying the integrity of the stitching forming the webbing loop.

Preferably, a displaceable means affixed to the tongue plate blocks passage of the loop through the auxiliary slot.

DESCRIPTION OF THE DRAWING

Further features and advantages of the present invention will be made more apparent as this description proceeds, reference being had to the accompanying drawing, wherein.

DETAILED DESCRIPTION OF THE INVENTION

Figure 1:
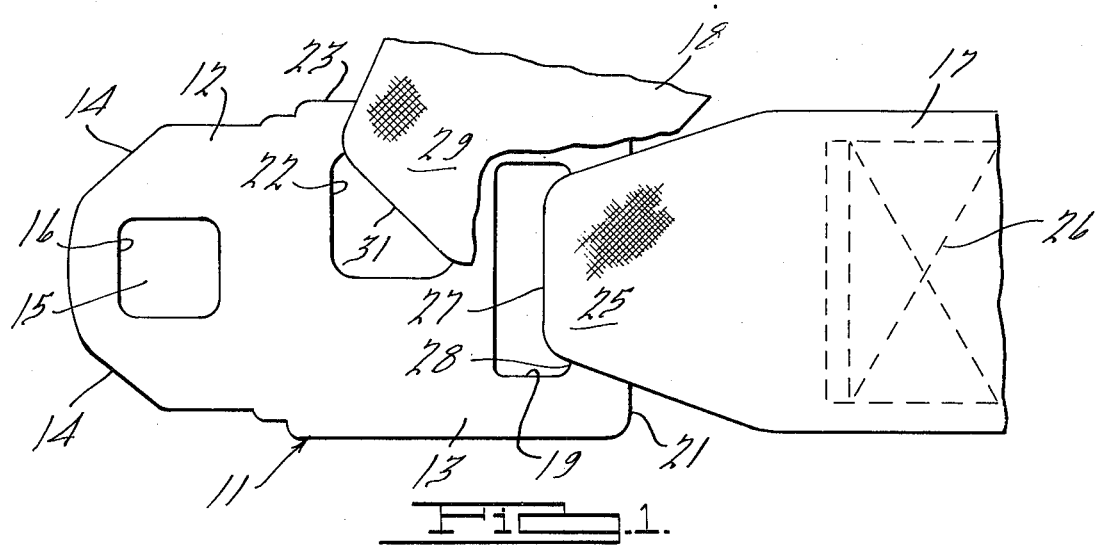
FIG. 1 is a plan view of a seat belt system tongue having fragmentary end portions of the shoulder harness webbing and lap belt webbing fastened thereto.

Referring now to the drawing, there is shown in FIG. 1 a seat belt system tongue 11 in the form of a plate having a buckle mechanism latch engaging portion 12 and a webbing receiving portion 13. The latch engaging portion 12, which for convenience may be referred to as the front end of the tongue, has tapered side edges 14 that function as a pilot for guiding the tongue into a buckle device (not shown) and an aperture 15 the front edge 16 of which is latchingly engagable by the latch element of the buckle device.

The webbing receiving portion 13 of the tongue 11 is provided with slot means through which ends of a lap belt webbing 17 and a shoulder harness webbing 18 are threaded. The slot means comprises a rectangular slot 19 substantially paralleling the rear lateral edge 21 of the webbing receiving portion 13 and a substantially triangular slot 22 located adjacent the side 23 of the tongue 11. A hypotenuse leg 24 of the triangular slot 23 is located at approximately a 45° angle to the side edge 23 and the lateral edge 21 of the tongue.

The end 25 of the lap belt webbing is threaded through the rectangular slot 19 and is folded back against the main webbing and permanently stitched thereto as indicated at 26. The extremity 27 of the folded webbing end 25 is tucked inwardly and stitched (not visible) to give a double material thickness adapted to bear against the rear edge 28 of the slot 19.

The end 29 of shoulder harness 18 is threaded similarly through slot 22 with the folded end 31 bearing against slot edge 24.

The foregoing construction and arrangement describes the tongue end of the lap belt and shoulder harness webbing of typical three-point seat belt systems. Each webbing is secured to a reel of a retractor mechanism mounted on vehicle body structure. In the event of a retractor mechanism failure, it is necessary to remove both retractor mechanisms since they are permanently coupled to each other through the permanent relationship of their respective webbings to the common tongue 11.

The tongue 11 embodying the present invention is provided with an auxiliary slot 32 which may be in communication with either slot 19 or slot 22. Preferably, it is in communication with slot 19 and extends from the tongue lateral or rear edge 21 through the edge 28 of the slot 19. The auxiliary slot 32 is of sufficient width so that the webbing loop 25 may be manipulated to pass through the slot and thus permit the separation of the lap belt webbing from the tongue 11. Accordingly, only the one inoperative retractor mechanism must be removed from the vehicle body structure for repair or replacement.

Figure 2:
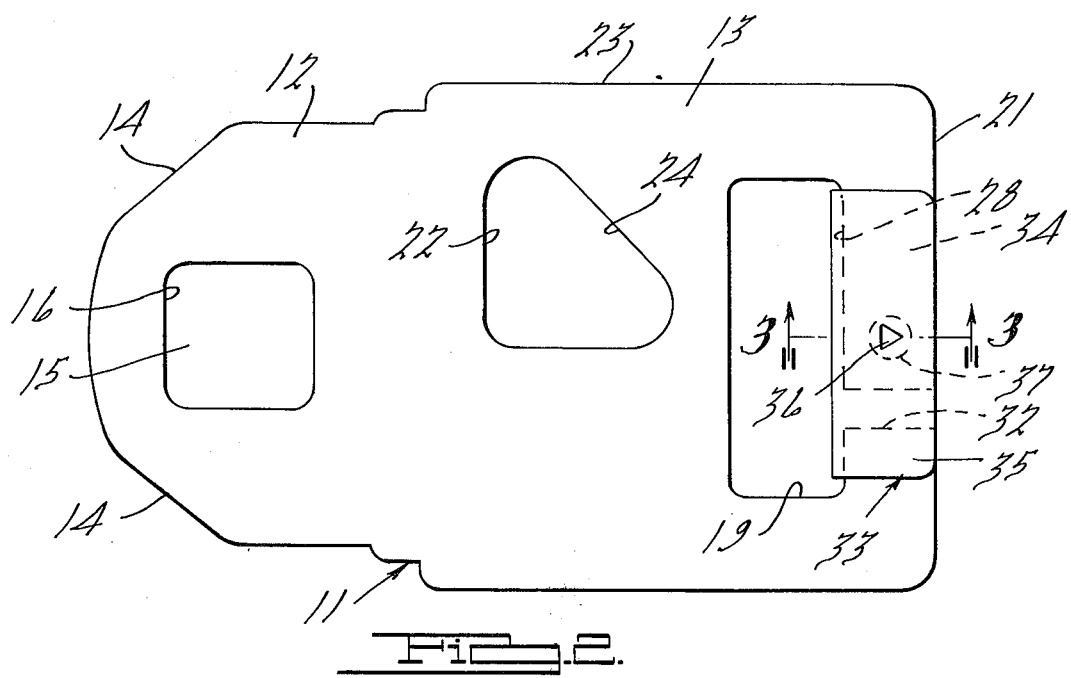
FIG. 2 is a plan view of a tongue having an auxiliary slot leading to the webbing receiving slot in accordance with the present invention.
Figure 3:
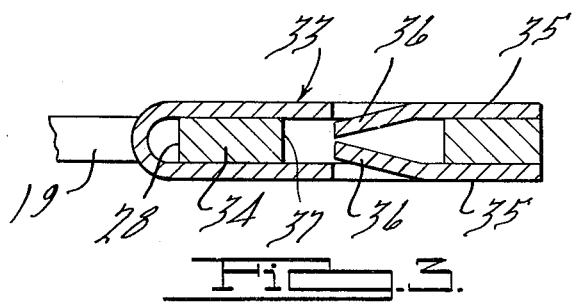
FIG. 3 is a section on the line 3—3 of FIG. 2.

It is desirable, however, to discourage disconnection of the webbing from the tongue except when necessary for repair or replacement purposes. Accordingly, the width of the auxiliary slot 32 is such that it offers some resistance to passage of the webbing therethrough. Also, the auxiliary slot 32 is located so that it is concealed from view when the webbing is threaded through the slot 19. Further, preferably, a displaceable means in the form of a clip 33 (see FIGS. 2 and 3) is snapped over the tongue plate metal strip 34 between the slot edge 28 and the tongue rear edge 21.

The clip 33 is U-formed of spring steel. Each leg 35 has an inwardly pierced detent 36 adapted to fit into an aperture 37 in the tongue plate metal strip 34. The clip 33 is readily snapped into place on the strip 34 from the slot 19 but the detents inhibit ready removal of the clip from the metal strip 34. The clip is assembled to the tongue plate before the webbing end 25 is permanently secured to the tongue 11. Removal of the clip 33 requires a tool to spread the legs 35 apart sufficiently to lift the detents 36 out of the aperture 37. When this is accomplished, the clip may be forced into the slot 19 and then removed form the loop end of the webbing. The webbing may then be disassembled from the tongue by forcing the webbing material through the auxiliary slot 32, as described above.

It is to be understood this invention is not limited to the exact construction illustrated and described above, but that various changes and modifications may be made without departing from the spirit and scope of the invention as defined by the following claims.

We claim:

1. A seat belt assembly comprising:

an elongated tongue plate having a buckle latch engaging portion and a webbing receiving portion, the webbing receiving portion having a main slot means extending laterally of the tongue plate through which ends of a lap belt and a shoulder harness webbing are threaded, each webbing end being folded against and stitched to its webbing into a permanent loop coupling the webbing to the tongue plate, wherein the improvement comprises:

an auxiliary slot extending from an edge of the tongue plate into the main slot means, the auxiliary slot providing a passageway through which the webbing loop may be passed for disassembly of the webbing from the tongue plate without destroying the integrity of the stitching forming the webbing loop, and a displaceable spring clip means affixed to the tongue plate blocks disassembly passage of the loop through the auxiliary slot, the spring clip means extending between the slot means and the tongue plate edge and having a part overlying the auxiliary slot means, the spring clip means and the tongue plate between the slot means and plate edge having interlocking retention means locking the clip means to the plate.

* * * * *